Sept. 1, 1925. 1,551,897
H. E. MARSH
HYDRAULIC BRAKE
Filed March 12, 1925 2 Sheets-Sheet 1
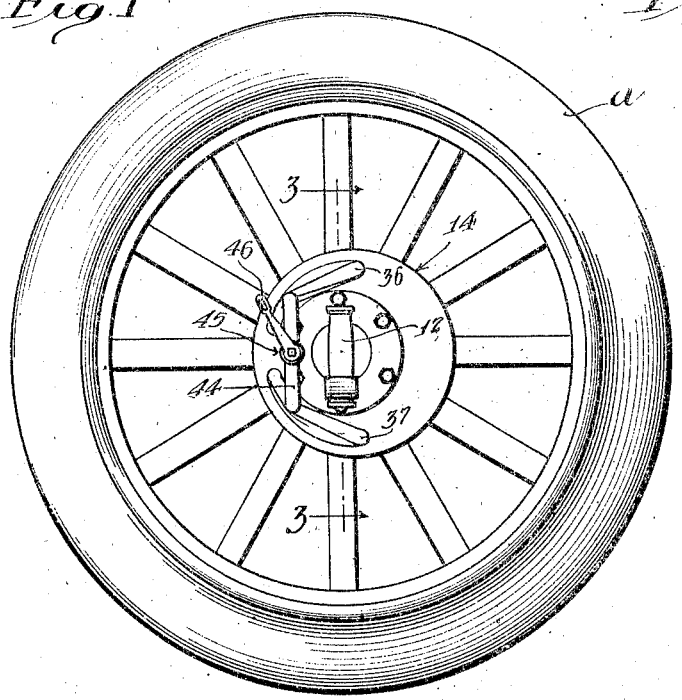
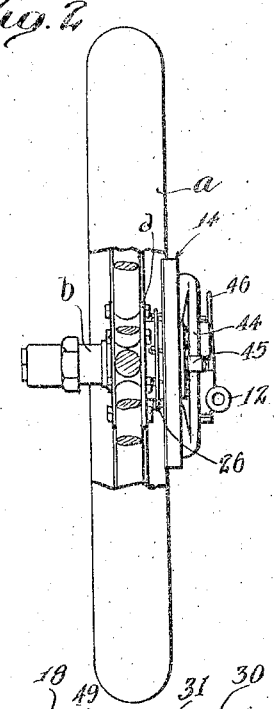
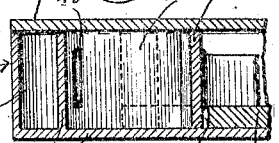
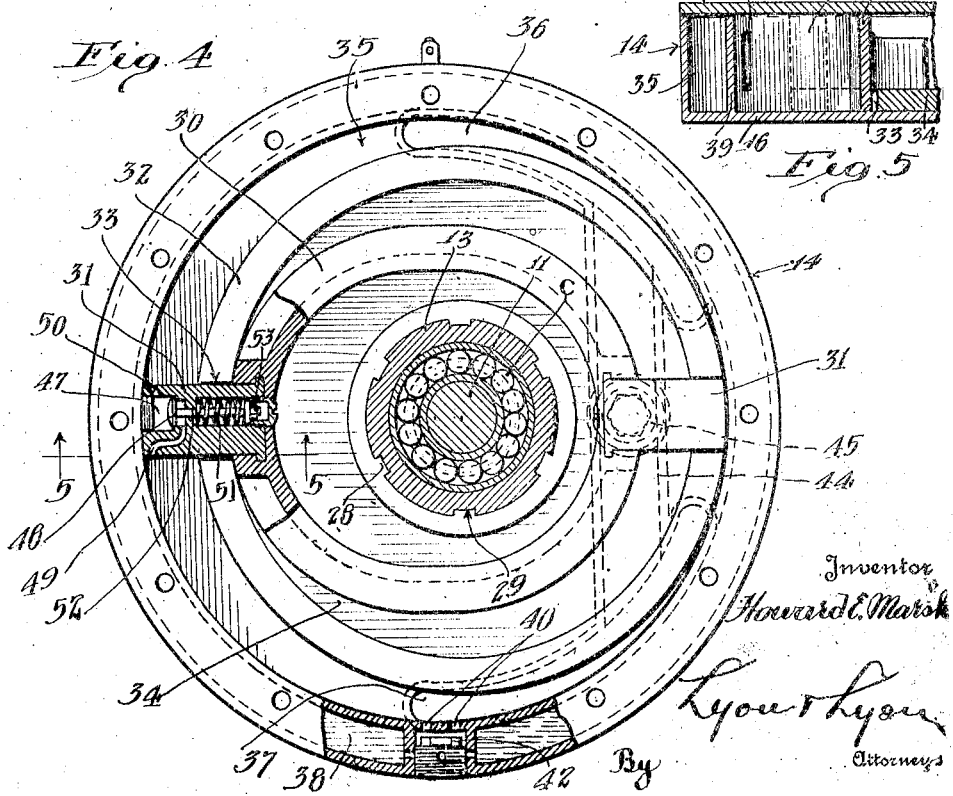
Inventor
Howard E. Marsh
By Lyon & Lyon
Attorneys Sept. 1, 1925.

H. E. MARSH

HYDRAULIC BRAKE

Filed March 12, 1925    2 Sheets-Sheet 2

1,551,897

Inventor
Howard E. Marsh
By Lyon & Lyon
Attorneys

Patented Sept. 1, 1925.

1,551,897

UNITED STATES PATENT OFFICE.

HOWARD E. MARSH, OF LOMPOC, CALIFORNIA.

HYDRAULIC BRAKE.

Application filed March 12, 1925. Serial No. 15,059.

*To all whom it may concern:*

Be it known that I, HOWARD E. MARSH, a citizen of the United States, residing at Lompoc, in the county of Santa Barbara and State of California, have invented a new and useful Hydraulic Brake, of which the following is a specification..

This invention relates to hydraulic brakes. and the invention is particularly useful in connection with motor drawn vehicles. The invention relates more particularly to that type of hydraulic brake in which the circulation of an impelled fluid through fluid-circulating means operated by the vehicle is retarded to produce a braking action upon the vehicle.

One of the objects of the invention is to provide a hydraulic brake that will operate very smoothly.

Another object is to provide a hydraulic brake constructed so as to be neat in appearance.

A further object is to construct a brake of this type that can be installed on the steering wheels of the vehicle.

An important object is to prevent sudden locking of the wheel to which the brake is applied, since this would be detrimental to the tire and also to other parts of the vehicle, besides being dangerous to the occupants thereof.

Other objects and advantages will appear in the subjoined detailed description.

The accompanying drawings illustrate the invention:

Fig. 1 is a side elevation of a hydraulic brake constructed in accordance with the provisions of this invention, the same being shown in place upon a vehicle wheel.

Fig. 2 is an edge view of Fig. 1 from the left thereof, portions of the wheel being broken away to expose brake parts that would otherwise be hidden.

Fig. 4 is a reduced elevation, partly in section, from the line indicated by 4—4, Fig. 3.

Fig. 5 is a fragmental inverted plan section on the line indicated by 5—5, Fig. 4.

Figure 3:
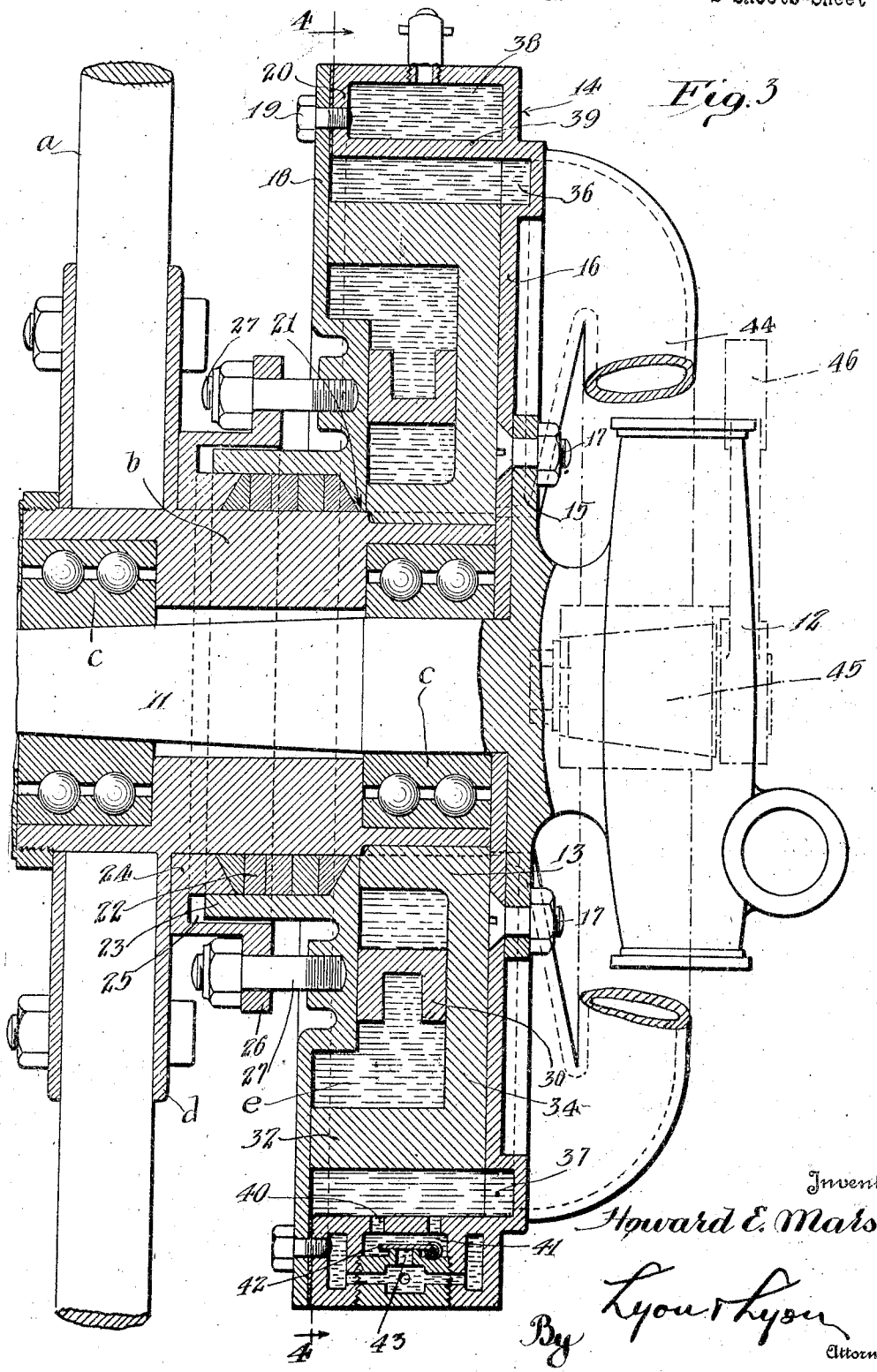
Fig. 3 is an enlarged sectional elevation on the line indicated by 3—3, Fig. 1.

The vehicle wheel on which the invention is mounted, in this instance, is indicated at $a$ and the hub of said wheel at $b$. The hub $b$ is rotatably mounted by a bearing or bearings $c$ on a spindle 11. If the wheel is one of the drive wheels of the vehicle, it will be otherwise mounted, as is well understood in this art, but in the instance illustrated the wheel is one of the steering wheels of the vehicle and the spindle 11, therefor, projects from a steering knuckle 12.

Driven by the hub $b$ is an impeller indicated in general by the character 13, said impeller being enclosed in a housing 14 which is stationarily mounted on the steering knuckle 12 in any suitable manner. Preferably, the steering knuckle 12 is provided with a flange 15 and the housing 14 is in sections, one of the sections 16 being secured by bolts 17 to the flange 15. The other section 18 of the housing is in the form of a plate secured by cap screws 19 to an annular flange 20 of the housing.

The hub $b$ projects into the housing 14 through an opening 21 in the plate 18 and it is advisable at this point to prevent leakage of fluid from the housing to as great a degree as possible. Accordingly, suitable packing in the form of rings 22 surrounds the hub $b$ between the plate 18 and hub flange $d$, and an annular flange 23 projecting outwardly from the plate 18 surrounds the packing 22. The packing 22 is compressed to a suitable extent by a gland 24 which is provided with an annular groove 25 to receive the flange 23. The gland 24 has a flange 26 which is adjustably secured by stud bolts 27 to the plate 18.

The impeller 13 is keyed or otherwise secured at 28 upon the outer end of the hub $b$ which is provided with keyways 29 to accommodate said keys. In this particular instance the keys 28 constitute integral portions of the impeller.

The impeller comprises a vane carrier 30 of more or less oval construction and, in this instance, channeled in cross section. The impeller also comprises vanes 31 which are fixed at their inner ends in the carrier 30 and have their outer ends substantially in contact with the peripheral wall of the housing. The impeller furthermore comprises a ring 32 which surrounds the carrier 30 and is provided with openings 33 through which the vanes 31 project. The carrier 30 is floating, being rotated by reason of engagement of the ring 32 with the impeller vanes, the ring 32 being an annular flange projecting from one edge of a disk 34 which also constitutes a portion of the impeller and which is the member that is keyed to the hub.

As will be seen in Fig. 4, the housing and carrier 30 are eccentric to the wheel a and the ring 32 is eccentric to the housing and concentric with the wheel so as to substantially contact with the housing at one side and be spaced from the housing at its opposite sides. In other words, there is a crescent shape channel 35 between the ring 32 and peripheral wall of the housing at all times and this crescent shape channel remains in one position while the vanes sweep through it from end to end. As the vanes move through the channel they pass ports 36, 37 in the housing and, if it be assumed that the ring 32 is rotating counter-clockwise in Fig. 4, then it may be assumed that the port 36 is the intake and the port 37 the exhaust port for the fluid within the housing, said fluid being indicated at e in Fig. 3 and occupying not only the channel 35 but also the space between the ring 32 and carrier 30 since the vanes 31 do not tightly fit in the openings 33, thus permitting leakage of the fluid e from the channel 35 through said openings.

The housing not only constitutes an impeller chamber or casing but it also provides an annular reservoir 38 so as to supply fluid to the channel 35 to replace that that may leak from the housing. The reservoir 38 is separated from the channel 35 by an annular wall 39 that is provided with a port or ports 40 communicating with a valve chamber 41 in which is a valve 42 controlling a port 43 communicating with the reservoir 38. The valve 42 opens away from the reservoir 38 toward the channel 35 so that fluid cannot be forced by the impeller from the channel 35 into the reservoir. The pumping action of the impeller will tend to keep the channel 35 filled with the fluid e. This fluid may be of any desired character and is preferably a heavy liquid, such as oil.

The ports 36, 37 are connected by a conduit or tube 44 which lies on one side of the steering knuckle 12 and said tube is provided with a suitable valve 45 operated by a crank arm 46 that in turn may be operated by any suitable means, not shown, extending to within reach of the driver of the vehicle or to any other desired position. The valve 45 controls the flow of the fluid e through the tube 44 as the impeller pumps said fluid through said tube and the more nearly the valve is closed the more the circulation of the fluid through the brake will be retarded, thus imposing a resisting pressure upon the vane and so retarding the rotation of said vane and the entire impeller. Such retardation affects the wheel and produces the desired braking effect upon said wheel.

If the vanes 33 were impervious to fluid and the valve 45 were closed, the impeller could not rotate and thus, upon sudden closing of the valve when the wheel is rotating, the wheel would be locked and skid upon the highway. To prevent skidding from this cause, it is preferable to construct the vanes so that when the back pressure against the vanes reaches a predetermined amount, as would be caused by closing the valve to a predetermined degree, leakage of the fluid e through the vanes from in front thereof to the rear may take place. To accomplish this, each of the vanes is constructed as follows: There is provided in the vane a valve chamber 47 in which is a plug valve 48 that controls a port 49 opening to the front face of the vane. The valve 48 moves away from the port 49 to open it and the chamber 47 is provided with a port 50 that opens to the rear face of the vane. A coil spring 51 tends to hold the valve 48 closed and said spring will be of any expansive strength that may be desired to withstand a predetermined pressure of fluid admitted to the underface of the valve through the port 49 as the impeller rotates.

If it be assumed, for example, that the valve 45 has been closed while the impeller is rotating, the pressure set up by the fluid e in the channel 35 against the front face of the impeller or vane will be imposed upon the under face of the valve 48, thus raising said valve from its seat and permitting a predetermined amount of the fluid to flow from in front of the vane into the space rearwardly of said vane so as to lower the resistance encountered by the vane and allow it to rotate at a relatively low speed. It is to be understood that the spring 51 may be of a strength that sudden closing of the valve 45, when the impeller is rotating at comparatively high speed, will open the valve 48 because of the inertia of the rotating fluid, and that when this inertia has been overcome by slowing down of the impeller, the spring 51 will effect closing of the valve 48 so that flow of the fluid from in front of the vane to the space in the rear thereof will cease, thus producing maximum braking effect.

From the foregoing, it will be seen that the ports 49, 50, valve plug 48 and spring 51 constitute one form of means operable by a predetermined fluid pressure to pass fluid from in front of the impeller to in rear of the impeller. These means are preferably adjustable to different predetermined pressures and, therefore, the stem 52 of the valve 48 is provided with an adjusting nut 53 to engage one end of the spring 51 while the other end of said spring engages the valve. The more the spring is compressed by adjustment of the nut 53, the quicker will the speed of the impeller be reduced at any particular degree of closing of the valve 45.

I claim:

1. A hydraulic brake comprising a housing and an impeller therein mounted for relative rotation, there being ports in the housing, and means to control the flow of fluid from port to port, the impeller having means operable by a predetermined fluid pressure to pass fluid from in front of the impeller to in rear of the impeller.

2. A hydraulic brake comprising a housing and an impeller therein mounted for relative rotation, there being ports in the housing, a conduit connecting the ports, and means to control the flow of fluid in the conduit, the impeller having a vane provided with a valve chamber and with ports opening from the valve chamber to the front and rear faces of the vane, and a spring closed valve in the valve chamber controlling one of the ports.

3. A hydraulic brake comprising a housing and an impeller therein mounted for relative rotation, there being ports in the housing, a conduit connecting the ports, means to control the flow of fluid in the conduit, said housing forming an annular reservoir surrounding the impeller, and valve means admitting fluid from the reservoir to adjacent the impeller and preventing reverse flow of said fluid.

4. A hydraulic brake comprising in combination with a spindle and a wheel rotatably mounted on said spindle, a flange connected with the spindle, a housing secured to said flange, an impeller in the housing connected with the wheel, there being ports in the housing, a conduit connecting the ports, and means to control the flow of fluid in the conduit.

5. A hydraulic brake comprising a housing having ports, a conduit connecting the ports, a vane carrier in the housing and concentric therewith, vanes projecting from the carrier and having their outer ends engaging the peripheral wall of the housing, a ring surrounding the carrier and eccentric to the housing and having an opening through which the vanes project, and means to control the flow of fluid in the conduit.

6. A hydraulic brake comprising in combination with the hub of a wheel, a housing fixed against rotation and having ports, a ring in the housing and eccentric thereto driven by the hub and having an opening, a vane carrier floating inside of said ring concentric with the housing, a vane projecting from the carrier through the opening and engaging the wall of the housing, a conduit connecting the ports, and means to control the flow of fluid in the conduit.

7. A hydraulic brake comprising a housing and an impeller therein mounted for relative rotation, there being ports in the housing, a conduit connecting the ports, means to control the flow of fluid in the conduit, the impeller having a vane provided with a valve chamber and with ports opening from the valve chamber to the front and rear faces of the valve, a valve in the valve chamber controlling one of the ports, a spring having one end engaging the valve to close said valve, and means adjustably engaging the other end of said spring.

8. A hydraulic brake comprising a housing and an impeller therein mounted for relative rotation, there being ports in the housing, a conduit connecting the ports, means to control the flow of fluid in the conduit, the impeller having means adjustable to different predetermined pressures and operable by such pressure to pass fluid from in front of the impeller to in rear of the impeller.

Signed at Los Angeles, California, this 4th day of March, 1925.

HOWARD E. MARSH.